United States Patent
Chen et al.

(10) Patent No.: US 12,046,726 B2
(45) Date of Patent: Jul. 23, 2024

(54) METHOD FOR REPAIRING WASTE SILICON-CARBON MATERIAL AND APPLICATION THEREOF

(71) Applicants: Guangdong Brunp Recycling Technology Co., Ltd., Foshan (CN); Hunan Brunp Recycling Technology Co., Ltd., Changsha (CN)

(72) Inventors: Jiangdong Chen, Foshan (CN); Haijun Yu, Foshan (CN); Yinghao Xie, Foshan (CN); Tao Wang, Foshan (CN); Changdong Li, Foshan (CN)

(73) Assignees: Guangdong Brunp Recycling Technology Co., Ltd., Foshan (CN); Hunan Brunp Recycling Technology Co., Ltd., Changsha (CN)

(*) Notice: Subject to any disclaimer, the term of this patent is extended or adjusted under 35 U.S.C. 154(b) by 0 days.

(21) Appl. No.: 18/284,702

(22) PCT Filed: Sep. 28, 2022

(86) PCT No.: PCT/CN2022/122266
§ 371 (c)(1),
(2) Date: Sep. 28, 2023

(87) PCT Pub. No.: WO2024/000884
PCT Pub. Date: Jan. 4, 2024

(65) Prior Publication Data
US 2024/0162516 A1    May 16, 2024

(30) Foreign Application Priority Data
Jun. 29, 2022  (CN) .......................... 202210754683.4

(51) Int. Cl.
| | | |
|---|---|---|
| *H01M 10/54* | (2006.01) | |
| *H01M 4/02* | (2006.01) | |
| *H01M 4/04* | (2006.01) | |
| *H01M 4/38* | (2006.01) | |
| *H01M 4/583* | (2010.01) | |

(52) U.S. Cl.
CPC .......... *H01M 10/54* (2013.01); *H01M 4/0404* (2013.01); *H01M 4/386* (2013.01); *H01M 4/583* (2013.01); *H01M 2004/027* (2013.01)

(58) Field of Classification Search
None
See application file for complete search history.

(56) References Cited

U.S. PATENT DOCUMENTS

2005/0118508 A1*  6/2005  Yong .................... H01M 4/139
                                                    429/246
2020/0020935 A1    1/2020  Costantino et al.

FOREIGN PATENT DOCUMENTS

| CN | 104143629 A | * 11/2014 |
|---|---|---|
| CN | 106129362 A | 11/2016 |
| CN | 107359326 A | 11/2017 |
| CN | 108598454 A | 9/2018 |
| CN | 109065993 A | 12/2018 |
| CN | 109671928 A | 4/2019 |
| CN | 110474032 A | 11/2019 |
| CN | 111755684 A | 10/2020 |
| CN | 112320802 A | 2/2021 |
| CN | 113036255 A | 6/2021 |
| CN | 114583315 A | 6/2022 |
| WO | 2017/025254 A1 | 2/2017 |

OTHER PUBLICATIONS

Machine translation of CN 104143629A, published on Nov. 12, 2014 (Year: 2014).*
Machine translation of CN107359326 A, published on Nov. 17, 2017 (Year: 2017).*
Uono, H., Kim, B.-C., Fuse, T., Ue, M., Yamaki, J.—Optimized Structure of Silicon/Carbon/Graphite Composites as an Anode Material for Li-Ion Batteries, Journal of The Electrochemical Society, 153 (9), A 1708-1713, 2006 (Year: 2006).*
PCT Search Report, PCT Application No. PCT/CN2022/122266, dated Mar. 3, 2023, 5 pages.
PCT Written Opinion, PCT Application No. PCT/CN2022/122266, dated Mar. 3, 2023, 5 pages.
Chinese Office Action, Chinese Application No. 202210754683.4, dated Jul. 28, 2023, 12 pages.
Chinese Search Report, Chinese Application No. 202210754683.4, dated Jul. 26, 2023, 5 pages.

* cited by examiner

*Primary Examiner* — Anca Eoff
(74) *Attorney, Agent, or Firm* — Leason Ellis LLP

(57) ABSTRACT

Disclosed is a method for repairing a waste silicon-carbon material which relates to the technical field of secondary batteries. The method for repairing a waste silicon-carbon material includes the following steps: (1) pretreating the waste silicon-carbon material to obtain a powdery mixture; (2) mixing the powdery mixture obtained in step (1) with an metal-organic framework compound, and washing and drying the mixture to obtain a black powder; and (3) mixing the black powder obtained in step (2) with graphite, calcining the mixture in an acetylene atmosphere, and subjecting the calcined product to vapor deposition, cooling, washing and drying to obtain a silicon-carbon material.

6 Claims, 3 Drawing Sheets

US 12,046,726 B2

METHOD FOR REPAIRING WASTE SILICON-CARBON MATERIAL AND APPLICATION THEREOF

CROSS-REFERENCE TO RELATED APPLICATION

This application is a national stage filing under 35 U.S.C. § 371 of international application number PCT/CN2022/122266, filed Sep. 28, 2022, which claims priority to Chinese patent application No. 202210754683.4 filed Jun. 29, 2022. The contents of these applications are incorporated herein by reference in their entirety.

TECHNICAL FIELD

The present disclosure relates to the technical field of secondary batteries, in particular to a method for repairing a waste silicon-carbon material and an application thereof.

BACKGROUND

Lithium-ion batteries (LIBs) are important energy storage devices with the advantages of a large capacity, a light weight, a long life, etc. There are many choices for the anodes of LIBs, such as the metal lithium (Li), graphite, silicon, silicon-carbon composite materials, tin selenide ($Sn\text{-}Se_x$), manganese tetroxide ($Mn_3O_4$), and rhenium disulfide ($ReS_2$). Among them, lithium metal anodes have been widely studied due to their advantages of a large theoretical capacity, a low density, a low redox potential, etc. However, compared with other types of anodes, the problem of lithium dendrites in the lithium anodes is more serious, and the growth of the lithium dendrites causes serious safety problems, which hinder the practical application of the lithium metal anodes. In addition, graphite anodes are the most common among anodes for lithium-ion batteries in industry. The reason is that the graphite anode has excellent conductivity and long-term stability; however, the specific capacity thereof is relatively low (about 372 $mAh \cdot g^{-1}$), which cannot meet the requirements of consumers for a high energy density and power density. Silicon-carbon anodes fully combine the basic advantages of silicon and carbon and exhibits the characteristics of a high capacity, a high strength, a high temperature resistance, a high rate, etc. In addition, silicon-carbon anodes are very promising as an anode material for lithium batteries due to their advantages of a lower deintercalation lithium voltage platform (less than 0.5 V vs $Li/Li^+$), a low reactivity with an electrolyte solution, abundant reserve of the element silicon in the crust of the earth, a low price, etc.

Silicon is an LIB anode material having a high theoretical capacity (4200 $mAh \cdot g^{-1}$), abundant resources and a low price, and has almost no lithium dendrite problems. However, the volume of the silicon material changes greatly (about 300%) during charging and discharging, which leads to its crushing; furthermore, the conductivity of the silicon anode is relatively poor. All the above problems seriously hinder the practical application thereof. In order to solve the existing problems in silicon anodes, developing a new silicon-based anode material is a key measure. Combining silicon and carbon to form a silicon-carbon material can effectively improve the conductivity of a silicon anode while alleviating adverse effects caused by the volume change thereof. During the service of the silicon-carbon anode, the volume of the silicon material often increases during charging and discharging, which makes the material prone to defects such as holes, cracks and voids, or even leads to structural damage to the material, making the anode unusable. At present, once the silicon-carbon anode has defects or is used up, it is generally discarded and cannot be used any more. In order to reduce the pollution to the environment, if the waste silicon-carbon anode material is effectively repaired, resource reuse will be realized, the cost will be reduced, the environmental benefits will be improved, and full life cycle management is realized. At present, there is no literature report on the repair of waste silicon-carbon anode materials at home and abroad.

SUMMARY

In view of this, an object of the present disclosure is to provide a method for repairing a waste silicon-carbon material and an application thereof, in order to overcome the above shortcomings of the existing technology.

To achieve the above object, the technical solution used by the present disclosure is a method for repairing a waste silicon-carbon material, the method including the following steps:

(1) pretreating the waste silicon-carbon material to obtain a powdery mixture;

(2) subjecting the powdery mixture obtained in step (1) and an metal-organic framework compound to ultrasonication and ball milling, and then washing and drying the product to obtain a black powder; and (3) mixing the black powder obtained in step (2) with graphite, calcining the mixture in an acetylene atmosphere, and subjecting the calcined product to vapor deposition, cooling, washing and drying to obtain a silicon-carbon material.

In the present disclosure, the spent waste silicon-carbon material is repaired, and the defects such as holes and voids in the material are almost completely filled with carbon of various sizes to obtain a silicon-carbon material with a high structural stability, thereby solving the drawback that the increase in the volume of the silicon material during charging and discharging causes structural damage; in addition, carbon materials of various sizes are used to synthesize a high-stability composite material, which reduces side reactions between the surface of the silicon anode and an electrolyte solution, inhibits the continuous thickening of an SEI film, and improves the performance of the silicon anode.

In the present disclosure, the residual organic electrolyte solution on the recovered silicon-carbon anode is used as a carbon source, and the recovered material is reused, whereby not only is the pollution of the electrolyte solution to the environment reduced, but also pollutants are effectively utilized to synthesize carbon with smaller particle sizes; furthermore, it cooperates with graphite with larger particle sizes to fill the voids in the anode material, thus effectively inhibiting the volume expansion of the silicon anode during charging and discharging. In the present disclosure, by using the metal-organic framework compound as a carbon source in combination with the carbon sources such as graphite, organic electrolyte solution and reduced acetylene gas, carbon of various sizes can be filled into the structure of the material, thereby effectively improving the structural stability of the material and solving the material expansion problem. Since the waste silicon-carbon material used in the present disclosure is an electrode sheet obtained after being charged and discharged many times, in which an organic electrolyte solution remains as a residue, the residual electrolyte solution can be used as a carbon source and incorporated into the silicon-carbon material during calcination. In addition, in the present disclosure, metal ions (Zn, Co, etc.) are further introduced into the anode material to synthesize metal carbides, which improve the conductivity of the material and provide more active sites for Li+ intercalation, thereby improving the electrochemical performance of the material.

Preferably, in step (1), the specific operation of the pretreatment involves subjecting the waste silicon-carbon anode material to ball milling, screening and impurity removal, where the ball milling speed is 300-500 rpm, and the ball milling time is 0.5-2 h.

By controlling the specific ball milling rotation speed to introduce the carbon source, small-sized carbon which is easily embedded into the waste silicon-carbon material can be obtained.

Preferably, in step (2), the metal-organic framework compound is at least one of ZIF-67, ZIF-8 or MOF-5. Further preferably, the metal-organic framework compound is ZIF-67.

Preferably, in step (2), the ultrasonication time is 0.5-1 h, the ball milling speed is 300-500 rpm, and the ball milling time is 0.5-2 h; and the washing includes washing with water and an ethanol solution in order, the concentration of the ethanol solution is 30-99.5 wt %, the drying temperature is 50-70° C., the drying time is 6-18 h, and the drying method is vacuum drying.

Preferably, in step (3), the mass ratio of the black powder to the graphite is black powder:graphite=1:(1-5).

Preferably, in step (3), the calcination is staged calcination and specifically involves: a first stage, where the ramp rate during calcination is 2-7° C./min, the calcination temperature is 300-400° C., and the calcination time is 1.5-2.5 h; a second stage, where the ramp rate during calcination is 2-7° C./min, the calcination temperature is 500-600° C., and the calcination time is 1.5-2.5 h; and a third stage, where the ramp rate during calcination is 2-7° C./min, the calcination temperature is 700-800° C., and the calcination time is 4-6 h.

In the actual experiment process, the inventors of the present application have found that the use of the staged calcination having three stages can further optimize the filling of the waste silicon-carbon material with various carbon sources. In particular, initially, the organic electrolyte solution is decomposed into carbon at 300-400° C., the metal-organic framework compound is then decomposed into carbon at 500-600° C., and finally, acetylene is reduced to carbon at 700-800° C., so that the defects in the internal structure of the waste silicon-carbon material can be better filled, and the recycling of the waste silicon-carbon anode can be better realized.

Preferably, in step (3), the washing includes washing with water and an ethanol solution in order, the concentration of the ethanol solution is 30-99.5 wt %, the drying temperature is 50-70° C., the drying time is 6-18 h, and the drying method is vacuum drying.

In addition, the present disclosure provides a silicon-carbon material prepared by using the above-mentioned method for repairing a waste silicon-carbon material.

Furthermore, the present disclosure provides an application of the silicon-carbon material in an anode active material.

Moreover, the present disclosure further provides an anode active material including the above-mentioned silicon-carbon material.

In addition, the present disclosure provides a method for preparing an anode active material, the method including the following steps:

(a) mixing a conductive agent with a silicon-carbon material, then adding a binder, and continuing mixing to obtain a mixture;
(b) dispersing the mixture obtained in step (a) into a solvent to form a slurry; and
(c) applying the slurry obtained in step (c) on a current collector, and drying and then rolling the current collector to obtain the anode active material.

The present disclosure provides the repaired silicon-carbon material as an anode active material, and therefore, an anode with a high capacity, a long cycle and a high rate can be obtained.

Preferably, in step (a), the conductive agent is at least one of acetylene black or graphene, the binder is at least one of styrene-butadiene rubber (SBR), sodium carboxymethylcellulose (CMC) or polyvinylidene fluoride (PVDF), and the mixing mode is dry mixing and stirring; and on a mass percentage basis, the ratio of the conductive agent, the silicon-carbon material and the binder is conductive agent:silicon-carbon material:binder=(10-20):(70-80):(10-20).

Preferably, in step (b), the solvent is at least one of water or N,N-dimethylacetamide; and the solid content of the prepared slurry is 40-60 wt %, and the viscosity of the slurry is 4500-6000 cps.

Preferably, in step (c), the current collector includes a copper foil.

Compared with the existing technology, the present disclosure has the following beneficial effects: (1) the preparation method provided by the present disclosure has simple operation, mild reaction conditions, and no pollution to the environment, and is suitable for industrial production. (2) In the present disclosure, the spent waste silicon-carbon anode material is repaired, and the defects such as holes and voids in the material are completely filled with carbon of various sizes to obtain a silicon-carbon modified material with a high structural stability, thereby solving the drawback that the increase in the volume of the silicon material during charging and discharging causes structural damage; in addition, carbon materials of various sizes are used to synthesize a high-stability composite material, which reduces side reactions between the surface of the silicon anode and an electrolyte solution, inhibits the continuous thickening of an SEI film, and improves the performance of the silicon anode. (3) In the present disclosure, the residual organic electrolyte solution on the recovered silicon-carbon anode is used as a carbon source, and the recovered material is reused, whereby not only is the pollution of the electrolyte solution to the environment reduced, but also pollutants are effectively re-utilized to synthesize carbon with smaller particle sizes; furthermore, it, in combination with graphite with larger particle sizes, fully fills the voids, thus effectively inhibiting the volume expansion of the silicon anode during charging and discharging. (4) In the present disclosure, by using the metal-organic framework compound as a carbon source in combination with the carbon sources such as graphite, organic electrolyte solution and reduced acetylene gas, the structural stability of the material is improved by filling in with carbon of various sizes, and the problem of material expansion is solved. Metal ions (Zn, Co, etc.) are additionally introduced to synthesize metal carbides, which improve the conductivity of the material and provide more active sites for Li+ intercalation, thereby improving the electrochemical performance. (5) In the present disclosure, by controlling the process conditions, the embedding of carbon is effectively guided in a directional way, so as to repair the structural defects of the material and in turn realize the recycling of the waste silicon-carbon anode.

DETAILED DESCRIPTION

Figure 1:
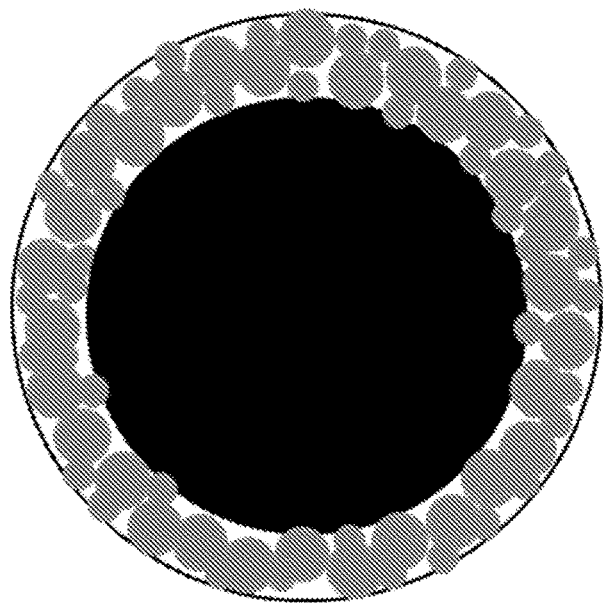
FIG. 1 is a schematic diagram of the morphology of a silicon-carbon material prepared in Embodiment 1 of the present disclosure.

In order to better illustrate the object, technical solution and advantages of the present disclosure, the present disclosure will be further illustrated below in conjunction with the accompanying drawings and specific embodiments.

In the embodiments, the experimental methods used are all conventional methods unless otherwise specified, and the employed materials, reagents etc. can all be obtained from commercial sources unless otherwise specified; and ZIF-67 solution was home-made during the experiment. 8 mmol of cobalt nitrate hexahydrate and 32 mmol of 2-methylimidazole were weighed and separately stirred and dissolved in 100 mL of methanol solution, and the two solutions were mixed and stirred for 30 min, and left to stand at room temperature for 24 h to obtain the ZIF-67 solution. The preparation of the ZIF-67 solution was not limited to the above preparation method.

ZIF-8 solution was home-made during the experiment. 1.5 g of zinc nitrate hexahydrate was weighed and dissolved in 70 mL of methanol solution to prepare solution A, 3.3 g of 2-methylimidazole was weighed and dissolved in 70 mL of methanol solution to prepare solution B, solution B was added to solution A, and the mixed solution was stirred at room temperature for 24 h to obtain the ZIF-8 solution. The preparation of the ZIF-8 solution was not limited to the above preparation method.

MOF-5 solution was home-made during the experiment. 1.21 g of zinc nitrate hexahydrate was weighed and dissolved in 40 mL of N'N-dimethylformamide (DMF) solution, 0.34 g of terephthalic acid ($H_2BDC$) was then added at room temperature, 1.6 g of triethanolamine (TEA) was further added under stirring, and the mixture was reacted at room temperature for 4 h to obtain the MOF-5 solution. The preparation of the MOF-5 solution was not limited to the above preparation method.

Embodiments 1-6 and Comparative Examples 1-4

Embodiment 1

A method for repairing a waste silicon-carbon material included the following steps:
(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;
(2) mixing the powdery mixture obtained in step (1) with the ZIF-67 solution, then subjecting the mixture to ultrasonication for 0.5 h, putting the ultrasonication product into a ceramic pot, adding the same weight of ceramic beads, performing ball milling in positive and negative directions (the rotation speed was 500 rpm in either case) by means of a planetary ball mill for 1 h, and subjecting the product to centrifugation, filtration, washing and drying to obtain a black powder, where the weight ratio of the powdery mixture to the ZIF-67 solution was powdery mixture:ZIF-67 solution=1:3; the washing included washing with water and ethanol solution several times in sequence, where the drying temperature was 60° C., the drying time was 12 h, and the drying method was vacuum drying; and
(3) mixing the black powder obtained in step (2) with graphite, calcining the mixture in an acetylene atmosphere, and subjecting the calcined product to vapor deposition, cooling, washing and drying to obtain a silicon-carbon material, where the mass ratio of the black powder to the graphite was black powder:graphite=1:1; the calcination was staged calcination and specifically involved: a first stage, where the ramp rate during calcination was 2° C./min, the calcination temperature was 400° C., and the calcination time was 2 h; a second stage, where the ramp rate during calcination was 2° C./min, the calcination temperature was 600° C., and the calcination time was 2 h; and a third stage, where the ramp rate during calcination was 2-7° C./min, the calcination temperature was 800° C., and the calcination time was 4 h; and the washing was carried out until the solution was neutral, followed by filtration, the drying temperature was 70° C., the drying time was 12 h, and the drying method was vacuum drying.

Embodiment 2

A method for repairing a waste silicon-carbon material included the following steps:
(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 2 h;
(2) mixing the powdery mixture obtained in step (1) with the ZIF-67 solution, then subjecting the mixture to ultrasonication for 1 h, putting the ultrasonication product into a ceramic pot, adding the same weight of ceramic beads, performing ball milling in positive and negative directions (the rotation speed was 300 rpm in either case) by means of a planetary ball mill for 1 h, and subjecting the product to centrifugation, filtration, washing and drying to obtain a black powder, where the weight ratio of the powdery mixture to the ZIF-67 solution was powdery mixture:ZIF-67 solution=1:3; the washing included washing with water and ethanol solution in sequence, where the drying temperature was 50° C., the drying time was 18 h, and the drying method was vacuum drying; and (3) mixing the black powder obtained in step (2) with graphite, calcining the mixture in an acetylene atmosphere, and subjecting the calcined product to vapor deposition, cooling, washing and drying to obtain a silicon-carbon material, where the mass ratio of the black powder to the graphite was black powder:graphite=1:5; the calcination was staged calcination and specifically involved: a first stage, where the ramp rate during calcination was 7° C./min, the calcination temperature was 300° C., and the calcination time was 2.5 h; a second stage, where the ramp rate during calcination was 7° C./min, the calcination temperature was 500° C., and the calcination time was 2.5 h; and a third stage, where the ramp rate during calcination was 7° C./min, the calcination temperature was 700° C., and the calcination time was 6 h; and the washing was carried out until the solution was neutral, followed by filtration, the drying temperature was 50° C., the drying time was 18 h, and the drying method was vacuum drying.

Embodiment 3

A method for repairing a waste silicon-carbon material included the following steps:
(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;
(2) mixing the powdery mixture obtained in step (1) with the ZIF-67 solution, then subjecting the mixture to ultrasonication for 0.5 h, putting the ultrasonication product into a ceramic pot, adding the same weight of ceramic beads, performing ball milling in positive and negative directions (the rotation speed was 500 rpm in either case) by means of a planetary ball mill for 1 h, and subjecting the product to centrifugation, filtration, washing and drying to obtain a black powder, where the weight ratio of the powdery mixture to the ZIF-67 solution was powdery mixture:ZIF-67 solution=1:3; the washing included washing with water and ethanol solution in sequence, where the drying temperature was 70° C., the drying time was 6 h, and the drying method was vacuum drying; and
(3) mixing the black powder obtained in step (2) with graphite, calcining the mixture in an acetylene atmosphere, and subjecting the calcined product to vapor deposition, cooling, washing and drying to obtain a silicon-carbon material, where the mass ratio of the black powder to the graphite was black powder:graphite=1:1; the calcination was staged calcination and specifically involved: a first stage, where the ramp rate during calcination was 4° C./min, the calcination temperature was 300° C., and the calcination time was 1.5 h; a second stage, where the ramp rate during calcination was 4° C./min, the calcination temperature was 500° C., and the calcination time was 1.5 h; and a third stage, where the ramp rate during calcination was 4° C./min, the calcination temperature was 700° C., and the calcination time was 10 h; and the washing was carried out until the solution was neutral, followed by filtration, the drying temperature was 70° C., the drying time was 6 h, and the drying method was vacuum drying.

Embodiment 4

By a single comparison between Embodiment 4 and Embodiment 1, the only difference between Embodiment 4 and Embodiment 1 lay in that the calcination method in step (3) was different (no staged calcination was used).

A method for repairing a waste silicon-carbon material included the following steps:
(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;
(2) mixing the powdery mixture obtained in step (1) with the ZIF-67 solution, then subjecting the mixture to ultrasonication for 0.5 h, putting the ultrasonication product into a ceramic pot, adding the same weight of ceramic beads, performing ball milling in positive and negative directions (the rotation speed was 500 rpm in either case) by means of a planetary ball mill for 1 h, and subjecting the product to centrifugation, filtration, washing and drying to obtain a black powder, where the weight ratio of the powdery mixture to the ZIF-67 solution was powdery mixture:ZIF-67 solution=1:3; the washing included washing with water and ethanol solution several times in sequence, where the drying temperature was 60° C., the drying time was 12 h, and the drying method was vacuum drying; and
(3) mixing the black powder obtained in step (2) with graphite, calcining the mixture in an acetylene atmosphere, and subjecting the calcined product to vapor deposition, cooling, washing and drying to obtain a silicon-carbon material, where the mass ratio of the black powder to the graphite was black powder:graphite=1:1; the ramp rate during calcination was 2° C./min, the calcination temperature was 800° C., and the calcination time is 8 h; and the washing was carried out until the solution was neutral, followed by filtration, the drying temperature was 70° C., the drying time was 12 h, and the drying method was vacuum drying.

Embodiment 5

By a single comparison between Embodiment 5 and Embodiment 1, the only difference between Embodiment 5 and Embodiment 1 lay in that the selection of the metal-organic framework compound in step (2) was different (ZIF-8 was used in Embodiment 5).

A method for repairing a waste silicon-carbon material included the following steps:
(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;

(2) mixing the powdery mixture obtained in step (1) with the ZIF-8 solution, then subjecting the mixture to ultrasonication for 0.5 h, putting the ultrasonication product into a ceramic pot, adding the same weight of ceramic beads, performing ball milling in positive and negative directions (the rotation speed was 500 rpm in either case) by means of a planetary ball mill for 1 h, and subjecting the product to centrifugation, filtration, washing and drying to obtain a black powder, where the weight ratio of the powdery mixture to the ZIF-8 solution was powdery mixture:ZIF-8=1:3; the washing included washing with water and ethanol solution several times in sequence, where the drying temperature was 60° C., the drying time was 12 h, and the drying method was vacuum drying; and (3) mixing the black powder obtained in step (2) with graphite, calcining the mixture in an acetylene atmosphere, and subjecting the calcined product to vapor deposition, cooling, washing and drying to obtain a silicon-carbon material, where the mass ratio of the black powder to the graphite was black powder:graphite=1:1; the calcination was staged calcination and specifically involved: a first stage, where the ramp rate during calcination was 2° C./min, the calcination temperature was 400° C., and the calcination time was 2 h; a second stage, where the ramp rate during calcination was 2° C./min, the calcination temperature was 600° C., and the calcination time was 2 h; and a third stage, where the ramp rate during calcination was 2-7° C./min, the calcination temperature was 800° C., and the calcination time was 4 h; and the washing was carried out until the solution was neutral, followed by filtration, the drying temperature was 70° C., the drying time was 12 h, and the drying method was vacuum drying.

Embodiment 6

By a single comparison between Embodiment 6 and Embodiment 1, the only difference between Embodiment 6 and Embodiment 1 lay in that the selection of the metal-organic framework compound in step (2) was different (MOF-5 was used in Embodiment 6).

A method for repairing a waste silicon-carbon material included the following steps:

(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;

(2) mixing the powdery mixture obtained in step (1) with the MOF-5 solution, then subjecting the mixture to ultrasonication for 0.5 h, putting the ultrasonication product into a ceramic pot, adding the same weight of ceramic beads, performing ball milling in positive and negative directions (the rotation speed was 500 rpm in either case) by means of a planetary ball mill for 1 h, and subjecting the product to centrifugation, filtration, washing and drying to obtain a black powder, where the weight ratio of the powdery mixture to the MOF-5 was powdery mixture:MOF-5=1:3; the washing included washing with water and ethanol solution several times in sequence, where the drying temperature was 60° C., the drying time was 12 h, and the drying method was vacuum drying; and (3) mixing the black powder obtained in step (2) with graphite, calcining the mixture in an acetylene atmosphere, and subjecting the calcined product to vapor deposition, cooling, washing and drying to obtain a silicon-carbon material, where the mass ratio of the black powder to the graphite was black powder:graphite=1:1; the calcination was staged calcination and specifically involved: a first stage, where the ramp rate during calcination was 2° C./min, the calcination temperature was 400° C., and the calcination time was 2 h; a second stage, where the ramp rate during calcination was 2° C./min, the calcination temperature was 600° C., and the calcination time was 2 h; and a third stage, where the ramp rate during calcination was 2-7° C./min, the calcination temperature was 800° C., and the calcination time was 4 h; and the washing was carried out until the solution was neutral, followed by filtration, the drying temperature was 70° C., the drying time was 12 h, and the drying method was vacuum drying.

Comparative Example 1

By a single comparison between Comparative Example 1 and Embodiment 1, the only difference between Comparative Example 1 and Embodiment 1 lay in that step (2) was different, and in Comparative Example 1, the ZIF-67 solution was replaced with a methanol solution.

Comparative Example 1 was a method for repairing a waste silicon-carbon material, including the following steps:

(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;

(2) mixing the powdery mixture obtained in step (1) with a methanol solution, then subjecting the mixture to ultrasonication for 0.5 h, putting the ultrasonication product into a ceramic pot, adding the same weight of ceramic beads, performing ball milling in positive and negative directions (the rotation speed was 500 rpm in either case) by means of a planetary ball mill for 1 h, and subjecting the product to centrifugation, filtration, washing and drying to obtain a black powder, where the weight ratio of the powdery mixture to the methanol solution was powdery mixture:methanol solution=1:3; the washing included washing with water and ethanol solution several times in sequence, where the drying temperature was 60° C., the drying time was 12 h, and the drying method was vacuum drying; and (3) mixing the black powder obtained in step (2) with graphite, calcining the mixture in an acetylene atmosphere, and subjecting the calcined product to vapor deposition, cooling, washing and drying to obtain a silicon-carbon material, where the mass ratio of the black powder to the graphite was black powder:graphite=1:1; the calcination was staged calcination and specifically involved: a first stage, where the ramp rate during calcination was 2° C./min, the calcination temperature was 400° C., and the calcination time was 2 h; a second stage, where the ramp rate during calcination was 2° C./min, the calcination temperature was 600° C., and the calcination time was 2 h; and a third stage, where the ramp rate during calcination was 2-7° C./min, the calcination temperature was 800° C., and the calcination time was 4 h; and the washing was carried out until the solution was neutral, followed by filtration, the drying temperature was 70° C., the drying time was 12 h, and the drying method was vacuum drying.

Comparative Example 2

By a single comparison between Comparative Example 2 and Embodiment 1, the only difference between Comparative Example 2 and Embodiment 1 lay in that step (3) was different, and there was no mixing with graphite in Comparative Example 2.

Comparative Example 2 was a method for repairing a waste silicon-carbon material, including the following steps:
(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;
(2) mixing the powdery mixture obtained in step (1) with the ZIF-67 solution, then subjecting the mixture to ultrasonication for 0.5 h, putting the ultrasonication product into a ceramic pot, adding the same weight of ceramic beads, performing ball milling in positive and negative directions (the rotation speed was 500 rpm in either case) by means of a planetary ball mill for 1 h, and subjecting the product to centrifugation, filtration, washing and drying to obtain a black powder, where the weight ratio of the powdery mixture to the ZIF-67 solution was powdery mixture:ZIF-67 solution=1:3; the washing included washing with water and ethanol solution several times in sequence, where the drying temperature was 60° C., the drying time was 12 h, and the drying method was vacuum drying; and
(3) calcining the black powder obtained in step (2) in an acetylene atmosphere, and subjecting the calcined product to vapor deposition, cooling, washing and drying to obtain a silicon-carbon material, where the calcination was staged calcination and specifically involved: a first stage, where the ramp rate during calcination was 2° C./min, the calcination temperature was 400° C., and the calcination time was 2 h; a second stage, where the ramp rate during calcination was 2° C./min, the calcination temperature was 600° C., and the calcination time was 2 h; and a third stage, where the ramp rate during calcination was 2-7° C./min, the calcination temperature was 800° C., and the calcination time was 4 h; and the washing was carried out until the solution was neutral, followed by filtration, the drying temperature was 70° C., the drying time was 12 h, and the drying method was vacuum drying.

Comparative Example 3

By a single comparison between Comparative Example 3 and Embodiment 1, the only difference between Comparative Example 3 and Embodiment 1 lay in that step (3) was different, and in Comparative Example 3, the calcination in the acetylene atmosphere was replaced with calcination in a nitrogen atmosphere.

Comparative Example 3 was a method for repairing a waste silicon-carbon material, including the following steps:
(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;
(2) mixing the powdery mixture obtained in step (1) with the ZIF-67 solution, then subjecting the mixture to ultrasonication for 0.5 h, putting the ultrasonication product into a ceramic pot, adding the same weight of ceramic beads, performing ball milling in positive and negative directions (the rotation speed was 500 rpm in either case) by means of a planetary ball mill for 1 h, and subjecting the product to centrifugation, filtration, washing and drying to obtain a black powder, where the weight ratio of the powdery mixture to the ZIF-67 solution was powdery mixture:ZIF-67 solution=1:3; the washing included washing with water and ethanol solution several times in sequence, where the drying temperature was 60° C., the drying time was 12 h, and the drying method was vacuum drying; and
(3) mixing the black powder obtained in step (2) with graphite, calcining the mixture in a nitrogen atmosphere, and subjecting the calcined product to vapor deposition, cooling, washing and drying to obtain a silicon-carbon material, where the mass ratio of the black powder to the graphite was black powder:graphite=1:1; the calcination was staged calcination and specifically involved: a first stage, where the ramp rate during calcination was 2° C./min, the calcination temperature was 400° C., and the calcination time was 2 h; a second stage, where the ramp rate during calcination was 2° C./min, the calcination temperature was 600° C., and the calcination time was 2 h; and a third stage, where the ramp rate during calcination was 2-7° C./min, the calcination temperature was 800° C., and the calcination time was 4 h; and the washing was carried out until the solution was neutral, followed by filtration, the drying temperature was 70° C., the drying time was 12 h, and the drying method was vacuum drying.

Comparative Example 4

In Comparative Example 4, a conventional treatment method in the art was used, including the following steps:
(1) pretreating the waste silicon-carbon material to obtain a powdery mixture, where the specific operation of the pretreatment involved putting the waste silicon-carbon anode material into a ceramic pot, adding the same weight of ceramic beads, and performing ball milling with a planetary ball mill, where ball milling, screening and impurity removal were carried out, the rotation was in positive and negative directions, the ball milling speed was 300 rpm, and the ball milling time was 0.5 h;

(2) subjecting the powdery mixture obtained in step (1) to calcination in a nitrogen atmosphere, where the temperature was raised to 800° C. at a ramp rate of 2° C./min and the calcination time was 2 h, and performing cooling, washing until the solution was neutral, filtration, and drying at a temperature of 70° C. for a drying time of 12 h, where the drying method was vacuum drying.

Application Example

Anode active materials were prepared from the silicon-carbon materials prepared in Embodiments 1-6 of the present disclosure and Comparative Examples 1-4. The preparation included the following steps:
- (a) mixing the conductive agent (acetylene black) with a silicon-carbon material (the silicon-carbon materials prepared in Embodiments 1-6 and Comparative Examples 1-4), adding a binder (5% CMC and 5% SBR), and continuing mixing to obtain a mixture, where the ratio of the conductive agent:the silicon-carbon material:the binder was 1:8:1;
- (b) dispersing the mixture obtained in step (a) into a solvent to form a slurry, which was a slurry having a solid content of 50 wt % and a viscosity of 4500-6000 cps; and
- (c) applying the slurry obtained in step (c) to a current collector, and drying and rolling the current collector to obtain an anode active material, where the coating thickness was 100-110 μm (the thickness might vary at different positions across the same breadth), and the compaction density was 1.75-1.85 g/cm³ (the thickness might vary at different positions across the same breadth).

Performance Test

Cycling performance test method: A constant-current charging and discharging test was carried out by charging and discharging operations on electrodes at a constant current, which was an electrochemical method for studying the capacitance characteristics of the electrodes. The testing voltage window of the corresponding material was 0.02-1.2 V, and the current densities used were respectively 0.05, 0.1, 0.25, 0.5, 1, 2, and 4 $Ag^{-1}$. Xinwei CT-3008W battery comprehensive tester was used for testing.

Test results: as shown in the figures below.

Figure 2:
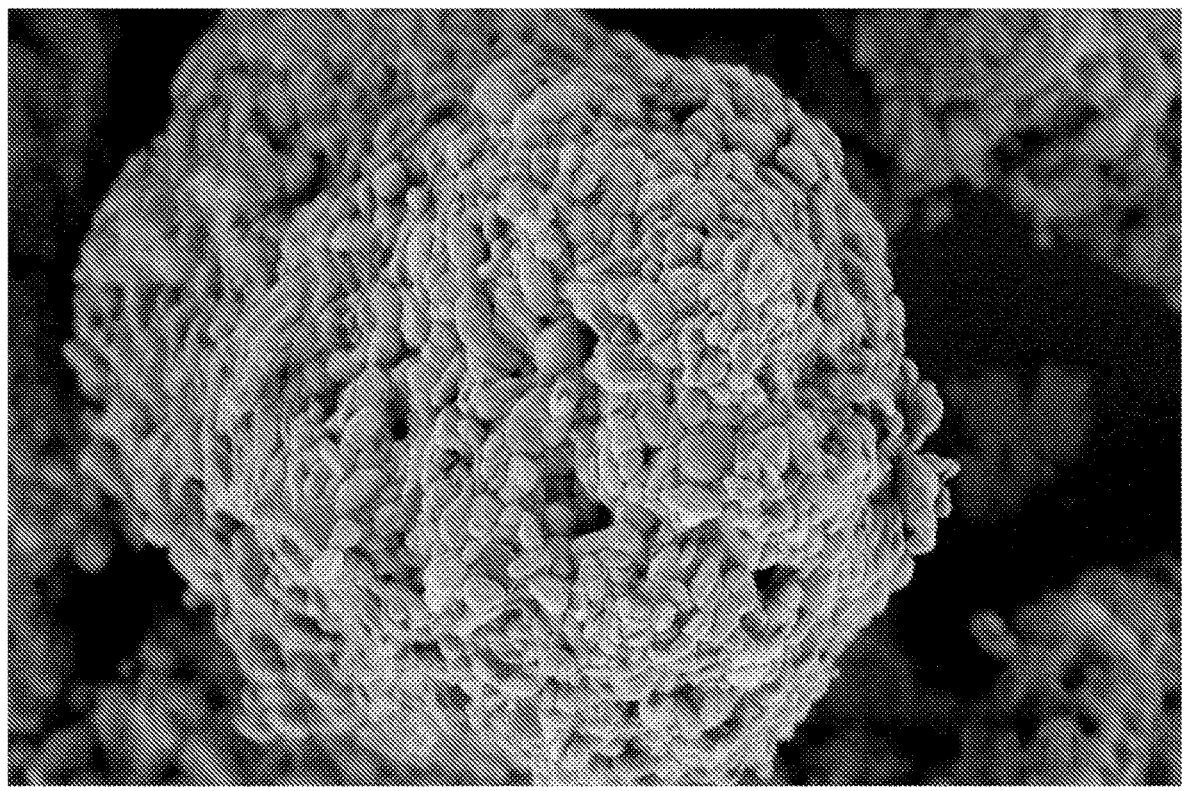
FIG. 2 is a scanning electron microscope (SEM) image of the silicon-carbon material prepared in Embodiment 1 of the present disclosure.

FIG. 1 was a schematic diagram of the morphology of the silicon-carbon material prepared in Embodiment 1 of the present disclosure, and FIG. 2 was a scanning electron microscope (SEM) image of the silicon-carbon material prepared in Embodiment 1 of the present disclosure. According to FIGS. 1 and 2, it could be seen that the repaired material in Embodiment 1 was repaired by 4 different types of carbon filling, which enhanced the structural stability of the material; and the schematic diagrams of the morphologies and the scanning electron micrographs of the other embodiments of the present disclosure were similar to those of Embodiment 1, so they were not listed herein.

Figure 3:
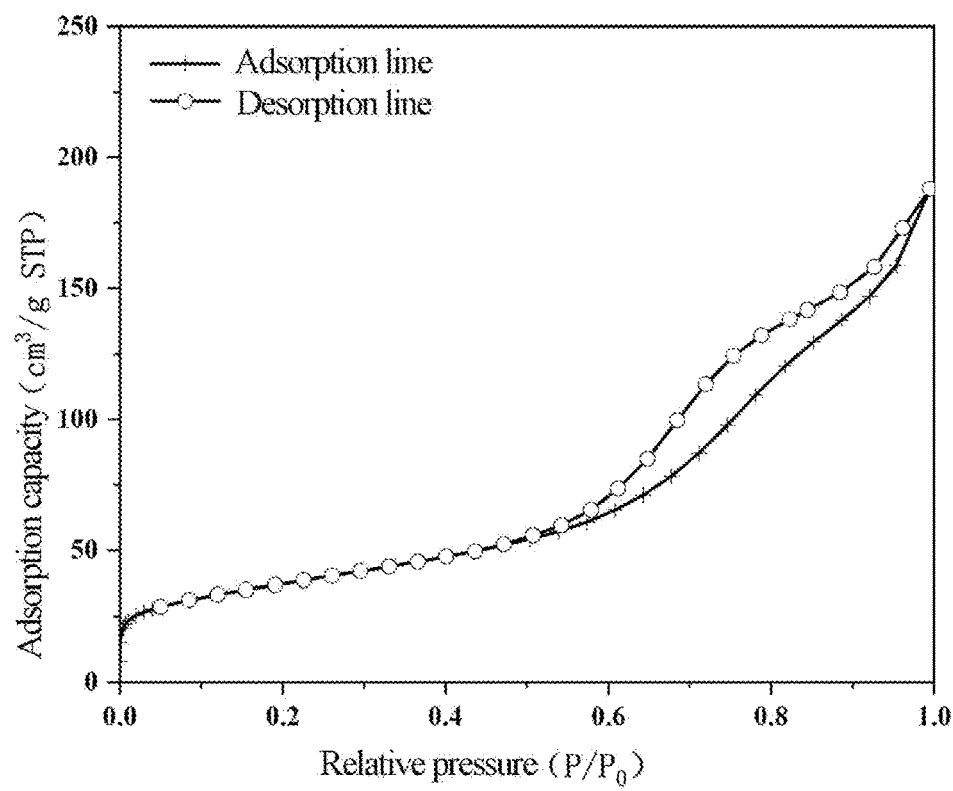
FIG. 3 is an adsorption-desorption isotherm diagram of the silicon-carbon material prepared in Embodiment 1 of the present disclosure.

FIG. 3 was an adsorption-desorption isotherm diagram of the silicon-carbon material prepared in Embodiment 1 of the present disclosure. The test method involved placing a powder sample to be tested in a U-shaped sample tube, enabling a mixed gas containing a certain proportion of adsorbate to flow through the sample, and determining the adsorption amount (BET) of the tested sample to adsorbate molecules ($N_2$) according to the change of the gas concentration before and after adsorption. The results in FIG. 3 showed that the sample had a typical H3 hysteresis loop, indicating that it was a mesoporous material but had a high adsorption and desorption capacity when P/P0<0.02, indicating that it had more microporous structures, that is, the material was a porous material which was mainly made up of microporous and mesoporous; in addition, the defects caused by silicon expansion were successfully filled with carbon.

Figure 4:
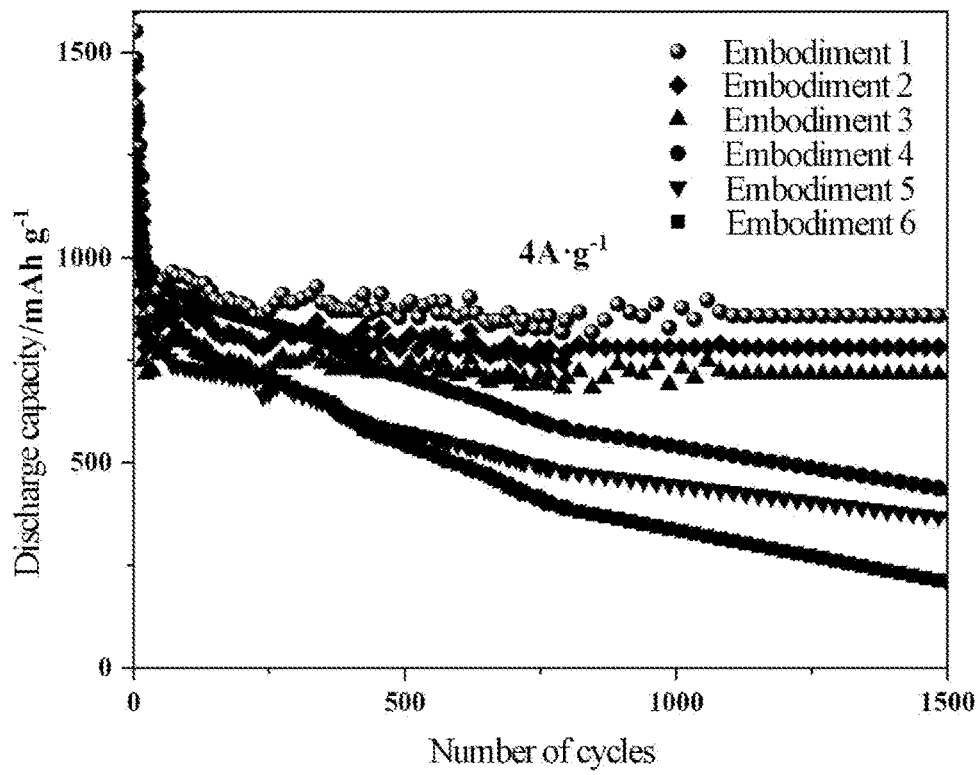
FIG. 4 is a cycling performance diagram of silicon-carbon materials prepared in Embodiments 1-6 of the present disclosure.

FIG. 4 was a cycling performance diagram of the silicon-carbon materials prepared in Embodiments 1-6. The test method involved testing a button battery formed by the anode obtained in the application example and a lithium sheet, and the test voltage was 0.02-1.2 V. The results in FIG. 4 showed that the repaired silicon-carbon material in Embodiment 1 exhibited excellent cycling performance (a capacity of 965 mAh $g^{-1}$ remained after 1500 cycles). Embodiments 1-3 had similar cycling performances (a higher electric capacity remained after 1500 cycles of charge and discharge); in Embodiment 4, no staged calcination was used, the cycling performance was slightly poor, and the voids could not be fully filled with carbon, but the structural stability remained to a certain extent, which met the requirements of repaired materials. Embodiments 5 and 6 showed that the silicon-carbon materials prepared using the metal-organic framework compound ZIF-67 exhibited a better electrochemical performance, while the selection of the metal-organic framework compound was different, resulting in a slightly worse electrochemical performance.

Figure 5:
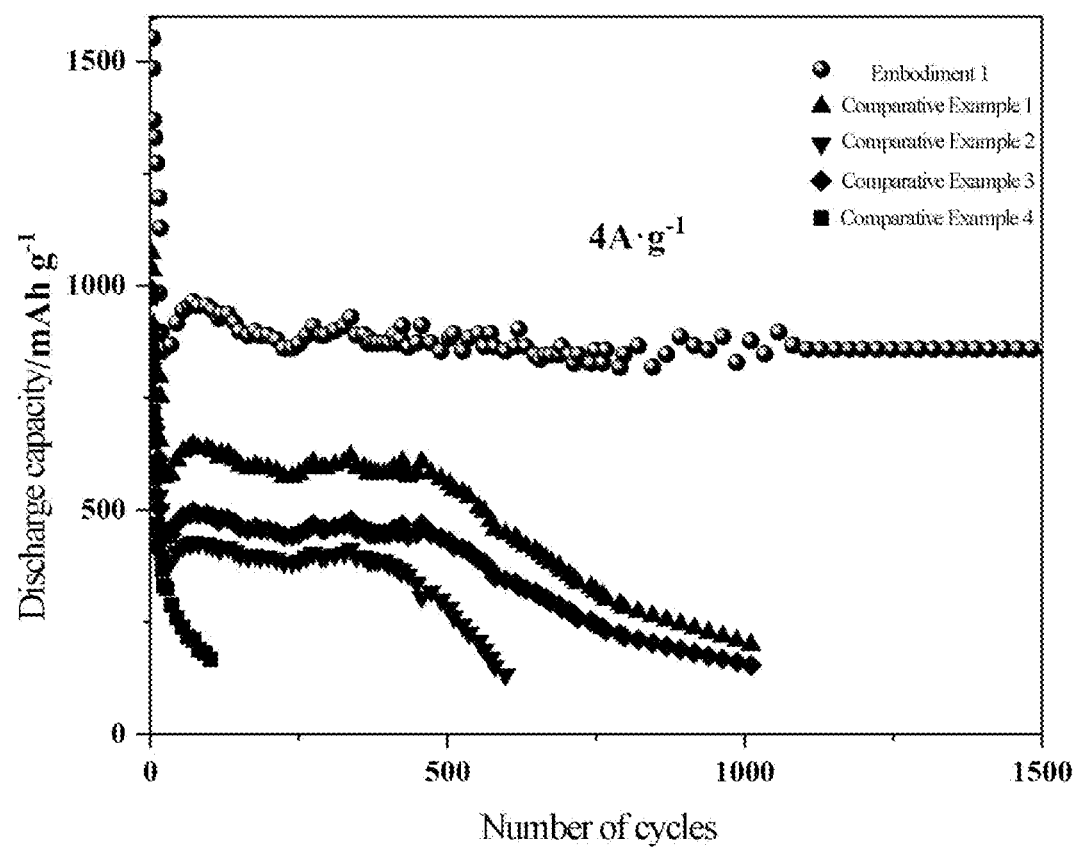
FIG. 5 is a cycling performance diagram of the silicon-carbon materials prepared in Embodiment 1 and Comparative Examples 1-4.

FIG. 5 was a cycling performance diagram of the silicon-carbon materials prepared in Embodiment 1 and Comparative Examples 1-4. The test method involved testing a button battery formed by the anode obtained in the application example and a lithium sheet, and the test voltage was 0.02-1.2 V. The results in FIG. 5 showed that the lack of any kind of carbon could lead to the inability to completely fill the expansion defects, which lead to the collapse of the structure of the battery during long-term charging and discharging, causing the cycle performance to drop sharply.

Finally, it should be noted that the above embodiments are only used to illustrate the technical solution of the present disclosure, rather than limiting the scope of protection of the present disclosure. Although the present disclosure has been described in detail with reference to the preferred embodiments, those of ordinary skill in the art should understand that the technical solution of the present disclosure can be modified or equivalently substituted without departing from the essence and scope of the technical solution of the present disclosure.

The invention claimed is:

1. A method for repairing a waste silicon-carbon material, comprising the following steps:
   (1) pretreating the waste silicon-carbon material to obtain a powdery mixture;
   (2) subjecting the powdery mixture obtained in step (1) and an metal-organic framework compound to ultrasonication and ball milling, and then washing and drying a resulting product to obtain a black powder; and
   (3) mixing the black powder obtained in step (2) with graphite, calcining a resulting mixture in an acetylene atmosphere, and subjecting a calcined product to vapor deposition, cooling, washing and drying to obtain a silicon-carbon material.

2. The method for repairing a waste silicon-carbon material according to claim 1, wherein in step (1), the pretreating involves subjecting the waste silicon-carbon material to ball milling, screening and impurity removal, wherein a ball milling speed is 300-500 rpm, and a ball milling time is 0.5-2 h.

3. The method for repairing a waste silicon-carbon material according to claim 1, wherein in step (2), the metal-organic framework compound is at least one of ZIF-67, ZIF-8 or MOF-5.

4. The method for repairing a waste silicon-carbon material according to claim 1, wherein in step (2), an ultrasonication time is 0.5-1 h, a ball milling speed is 300-500 rpm, and a ball milling time is 0.5-2 h.

5. The method for repairing a waste silicon-carbon material according to claim 1, wherein in step (3), a mass ratio of the black powder to the graphite is black powder:graphite=1: (1-5).

6. The method for repairing a waste silicon-carbon material according to claim 1, wherein in step (3), the calcination is staged calcination and involves: a first stage, wherein a ramp rate during calcination is 2-7° C./min, a calcination temperature is 300-400° C., and a calcination time is 1.5-2.5 h; a second stage, wherein a ramp rate during calcination is 2-7° C./min, a calcination temperature is 500-600° C., and a calcination time is 1.5-2.5 h; and a third stage, wherein a ramp rate during calcination is 2-7° C./min, a calcination temperature is 700-800° C., and a calcination time is 4-6 h.

* * * * *